US006660814B1

(12) United States Patent
Kröner et al.

(10) Patent No.: US 6,660,814 B1
(45) Date of Patent: *Dec. 9, 2003

(54) PREPARATION OF EMULSION HOMO- AND COPOLYMERS AND DEVICE THEREFORE

(75) Inventors: Huberrus Kröner, Neustadt (DE); Wolfgang Klanig, Heidelberg (DE); Bradley Ronald Morrison, Mannheim (DE); Rainer Klostermann, Ketsch (DE); Holger Schöpke, Neckargemünd (DE); Walter Kastenhuber, Mannheim (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 763 days.

(21) Appl. No.: 08/940,996

(22) Filed: Sep. 30, 1997

(30) Foreign Application Priority Data

Oct. 2, 1996 (DE) .......................................... 196 40 793

(51) Int. Cl.$^7$ .................................................. C08F 2/00
(52) U.S. Cl. ............................. 526/88; 526/67; 526/80; 526/82; 526/920; 526/922; 524/543; 524/459
(58) Field of Search ............................. 526/67, 80, 88, 526/82, 91, 920, 922; 524/543, 459

(56) References Cited

U.S. PATENT DOCUMENTS

| | | | | |
|---|---|---|---|---|
| 4,182,820 A | * | 1/1980 | Curfman et al. | 526/212 |
| 4,273,904 A | * | 6/1981 | Bush et al. | 526/91 |
| 4,482,685 A | * | 11/1984 | Chin et al. | 526/91 |
| 4,727,110 A | * | 2/1988 | Fan et al. | 524/801 |
| 5,216,065 A | * | 6/1993 | Colyer et al. | 524/459 |

FOREIGN PATENT DOCUMENTS

| | | |
|---|---|---|
| EP | 00698633 A2 * | 2/1996 |
| WO | 009531485 A1 * | 11/1995 |

OTHER PUBLICATIONS

D.C.Blackley "Emulsion Polymerization", A halsted Press Book, 1975 pp 6, 395, 419, 434–440, Feb. 1999.*

* cited by examiner

Primary Examiner—Tatyana Zalukaeva
(74) Attorney, Agent, or Firm—Keil & Weinkauf

(57) ABSTRACT

In the process and a correspondingly appropriate device for preparing homo- or copolymers of at least one of the, polymerizable monomers of the group consisting of styrene, butadiene, vinyl chloride, vinyl acetate, vinylidene chloride, alkyl (meth)acrylate (meth)acrylic acid, (meth)acrylonitrile and (meth)acrylamide reaction is carried out at at least 40° C. in the presence of a dispersing auxiliary and of a free-radical polymerization initiator such that at least 85% by weight of the polymer is formed from these monomers. In the multistage process the procedure is such that a) in a first stage water is added as a solvent which is inert in the reaction and dispersing auxiliaries, seed and a first portion of monomer(s) are added if desired, b) in a second stage initiator is added, and c) in a third stage the remainder or all of the monomer(s) is added directly or in emulsion form and in the presence of further water and, if desired, further dispersing auxiliary or other auxiliaries, it also being possible to operate any two of the stages as a single stage.

The reaction mixture, which is in emulsion form, is moved in all or some stages through an external circuit which leads from and back to the reaction vessel (2) and comprises at least one low-shear pump (7) and at least one heat exchanger (8) having an essentially laminar flow profile. The products prepared by this process, which involves short preparation times, have good performance properties (for adhesive bonds, for example).

13 Claims, 2 Drawing Sheets

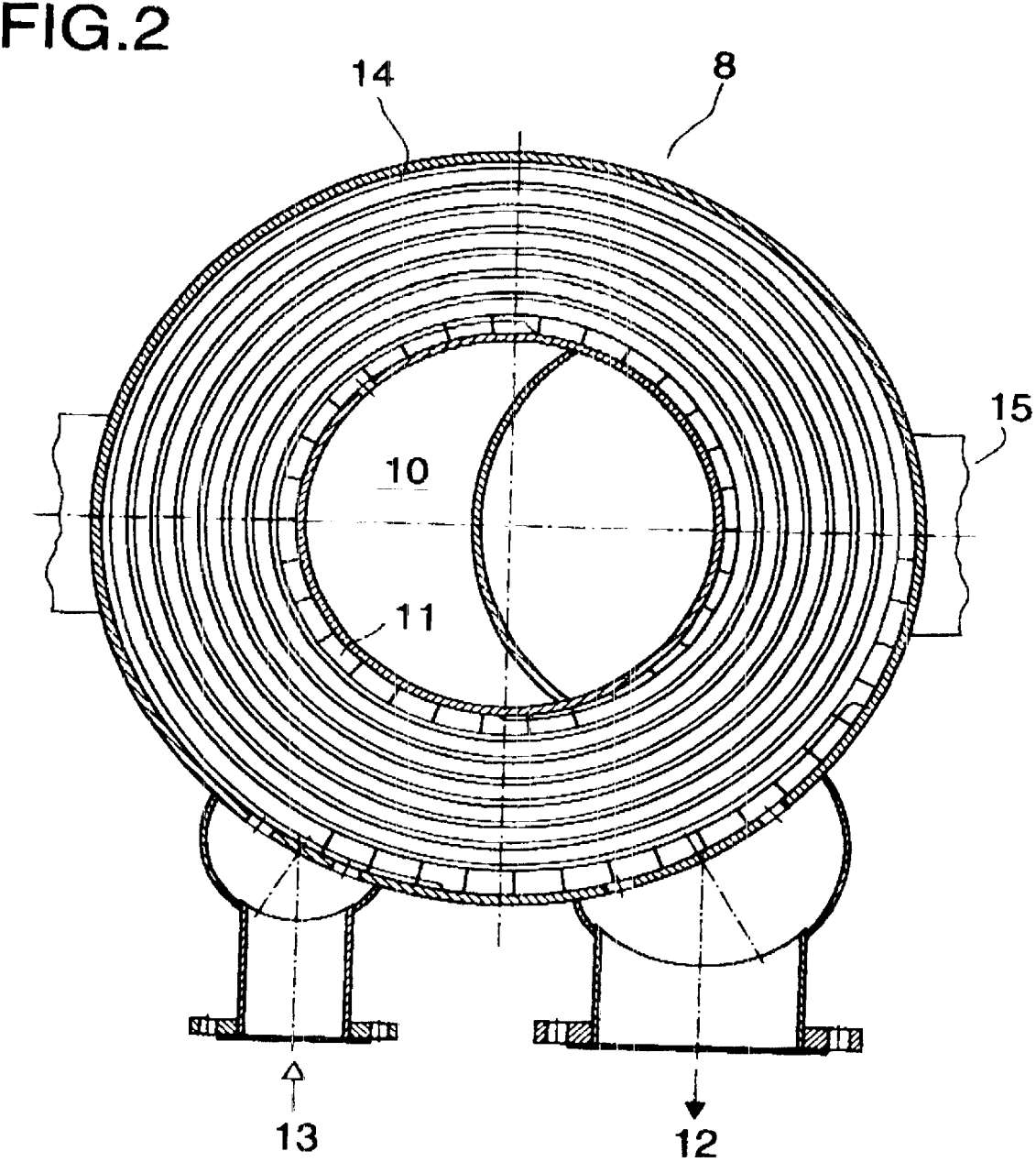

PREPARATION OF EMULSION HOMO- AND COPOLYMERS AND DEVICE THEREFORE

The inventions relates to a process and a device for preparing homopolymers and copolymers, including those of styrene, butadiene and (meth)acrylic acid and derivatives thereof, by the emulsion polymerization technique.

The manner in which polymerizations are carried out involves bringing one or more polymnerizable monomers into disperse distribution in a liquid which is ideally inert in the reaction—usually water—in presence of detergents or soaps as dispersing auxiliaries. Polymerization takes place predominantly by means of initiator radicals in the monomer-containing micelles that are formed. High molecule masses can be obtained in such a polymerization, since monomer is able to make its way continually into the micelles. The mechanism is normally that of a free-radical polymerization; the reaction products can in many cases be processed further directly in dispersion form (as, for example, in the case of the production of paints and adhesives. Known products are homo- and copolymers (P) of styrere (S), vinyl chloride (VC) butadiene (Bu) or methyl methacrylate (MMA). The particle size and its distribution can often be controlled by the use of see (particles), added to start with or produced in situ. Typical conditions in an industrial-scale process (taking the example of a styrene-butadiene copolymer or a polyacrylate) are reaction periods of from 3 to 12 h at from 40 to 100° C.

DE-A 23 32 637describes an emulsion polymerization in which butadiene is reacted with comonomers such as styrene, acrylonitrile (AN) or esters of acrylic or methacrylic acid in the presence of customary emulsifying auxiliaries, such as higher fatty acids, higher alkyl (aryl)sulfonates, adducts of alkylene oxides with long-chain fatty alcohols, and free-radical initiators such as alkali metal persulfates, at more than 115° C. An advantage over the prior art with operation at less than 80° C. is said to be the higher polymerization rate. However, there is often an adverse effect on the performance properties of products prepared at such high temperatures, in respect for example of the molecular mass distribution, the particle size distribution and, in association therewith, the adhesive strength, for example. In addition, safety aspects (such as the pressure developed when butadiene is a component) are increasingly playing an important role in connection with the reaction regime.

Nevertheless, any reaction regime at higher temperatures—in other words, more than 80° C., in particular more than 85° C.—is an important parameter for large-scale industrial plant, since the reaction times can be significantly reduced; in other words, a large-scale industrial process is carried out with lower cycle times, which helps save on investment costs for a greater number of plant units. A major problem area which then requires solution, however, is the dissipation of heat, for example in order to help avoid instances of local overheating in the case of exothermic reactions, since such overheating can in many cases lead to secondary reactions, irregular molecular mass distributions or irregular particle sizes. EP-A 0 486 262discloses the preparation of emulsion copolymers where the energy balance is monitored and the result is used to control the supply of the comonomers and the temperature. Temperature control is effected by the use, inter alia, of an external heat exchanger. No information is given about the quality of the products or the design of the pumps or heat exchanger.

A heat treatment of homo- or copolymers of VC, by means for example of an external heat exchanger, for reducing viscosity after the actual emulsion polymerization is described in Research Disclosure July 1978, reference 17149, p. 17. No mention is made of influencing the actual main reaction.

EP-A 0 608 567, for use in the suspension polymerization of VC to form homo- or copolymers, in a vessel with stirrer and an external heat exchanger, describes a special pump (Hydrostal pump) by means of which the reaction mixture is guided at an angle of 90°C., the interior having a conical hub with a rotor blade which movies with a spirally rotating motion. No remarks are made about the heat exchanger. Stirring energy and circulation energy must he kept within a certain proportion. A comparable pump is used in EP-B 0 526 741 as well, which also deals with the suspension polymerization of VC; there, the type of heat exchanger is regarded as not being critical (see p. 4, lines 36 to 40).

In the process for preparing emulsion polymers of DE-A 44 42 577, the energy liberated in the course of the exothermic reaction is dissipated in part by distilling off a water/monomer mixture under reduced pressure from the reaction vessel (a stirred reactor). Although this measure does lead to a certain reduction in the polymerization period, i.e. essentially in the time required for adding the monomer or monomers, it is still not sufficiently suitable for large-scale industrial plant, especially since there is little or no provision for it to be used widely, for example for low-boiling comonomers and (co)monomers which are gaseous under standard conditions (for example, comonomers of the butadiene type).

It is an object of the present invention to find a preparation process which can be carried out on an industrial scale and has a broad field of use but which does not have the disadvantages of the prior art. In other words, in particular, short reaction times should be possible, a broad spectrum of different monomers, including those which are gaseous under standard conditions should be accepted, and the products should be at least comparable in terms of the performance properties with current products.

We have found that this object is achieved by a process for preparing homo- or copolymers of at least one of the polymerizable monomers of is the group consisting of styrene, butadiene, vinyl chloride, vinyl acetate, vinylidene chloride, alkyl (meth)acrylate (meth)acrylic acid, (meth)acrylonitrile and (meth)acrylamide in an emulsion polymerization technique at at lease 40° C. in the presence of a dispersing auxiliary and of a free-radical polymerization initiator. The novel process comprises preparing the polymer, at least 85% by weight of which is formed from one or more of these monomers, in the following stages, where a) in a first stage water is added as a solvent which is inert in the reaction, and dispersing auxiliaries, seed and a first portion of monomer(s) arc added if desired, b) in a second stage initiator is added, and c) in a third stage the remainder or all of the monomer(s) is added directly or in emulsion form and in the presence of further water and, if desired, further dispersing auxiliary or other auxiliaries, it also being possible to operate the stage a) and b) or b) and c) in each case as single stages, and in certain stages or every stage moving the reaction mixture in its dispersion form by means of an external circuit which leads from and back to the reaction vessel and comprises at at least one low-shear pump and at least one heat exchanger having an essentially laminar flow profile, and carrying out polymerization at from 40 to 120° C.

In preferred embodiments of the novel process at least 90% by weight, in particular at least 93% by weight, of the polymer consists of one or more of the abovementioned monomers, and the polymerization is carried out at from 50 to 100°C., in particular from 60 to 95° C. and, very particularly, from 70 to 95°C. Of the monomers mentioned, preference is given to styrene, butadiene, alkyl (meth)acrylate and (meth)acrylonitrile.

The novel process can be carried out either by including a portion of monomer(s) in the initial charge in stage a) or in a combination of a) and b) and subsequently, in stage c) or in a combination of b) and c), adding the remainder, or by supplying the total amount exclusively in stage c) or in a combination of b) and c). If monomer(s) is (are) included in the initial charge in stage a) or in a combination of a) and b), then the amount thereof is judiciously from 3 to 30% by weight of the total amount of monomer(s) to be supplied, preferably from 5 to 25% by weight and, with particular preference, from 8 to 20% by weight. Monomers of low or zero solubility in water are judiciously supplied in emulsion form, i.e with water and dispersing auxiliary.

Other suitable comonomers in addition to the monomers mentioned above include vinyltoluene, N-methylol(meth)acrylamide and $C_2$–$C_3$-hydroxyallyl (meth)acrylate. Unless specified otherwise, alkyl in the monomer names means a $C_1$–$C_9$ linear or $C_3$–$C_9$ branched radical, especially methyl, ethyl, isopropyl, n-butyl, tert-butyl, isobutyl or 2-ethylhexyl.

The dispersing auxiliaries can be included in the initial charge prior to the addition of the monomer or monomers or can be supplied in addition to the monomers or in the monomer emulsion The amount added, relative to the overall amount of monomer(s) as 100% by weight, is from 0.01 to 10% by weight, preferably from 0.05 to 8% by weight (and also depends on the type: whether nonionic or anionic). Known compounds are—in addition to natural soaps—alkyl polyglycol ethers, such as ethoxylated lauryl alcohol, alkylpbenol polyglorcol ethers, such as those of nonylphenols or salts of long-chain alkyl, aryl or alkyaryl acids, such as Na-lauryl sulfate. In addition to these it is also possible for protective colloids to be present (in amounts of from 0.001 to 15% by weight), such as cellulose ethers or polyvinyl alcohol. In a preferred embodiment of the invention dispersing auxiliaries are present in stage a) either together with seed or with the first portion of monomer(s); it is also possible that all three components are already present in stage a). Latest in stage c) dispersing auxiliaries have to be present.

The seed is either produced in situ or included in the initial charge; if desired, it can he added at various points in time, in order, for example, to bring about a polydisperse or polymodal (e.g. bimodal) distribution. The proportions relative to the amount of monomer(s) as 100% by weight are frequently from 0.1 to 5.0% by weight, preferably from 0.2 to 3.0% by weight. In a preferred embodiment of the invention seed is present in stage a) either together with the first portion of monomer(s) or not.

Suitable polymerization initiators for the beginning, for the complete implementation and/or for the continuation of the reaction are water insoluble or, preferably, water-soluble compounds. Examples of the known free-radical initiators include hydrogen peroxide, peroxodisulfuric acid and its salts, for example K or $NH_4$ peroxodizulfate, dibeizoyl peroxide, lauryl peroxide, tri-tert-butyl peroxide, azodiisobutyronitrile, alone or together with reducing components such as Na bisulfite, ascorbic acid or Fe(II) salts, for example tert-butyl hydropeioxide with Na bisulfite-formaldehyde adduct or Na bisulfite-acetone adduct. The polymerization initiator can be added in one or more stages, and in the latter case in varying amounts and by varying methods; for example, in the case of more complex systems, such as redox initiators, it is also possible for some to be included in the initial charge aid the remainder added continuously thereafter. In many cases the polymerization initiator is metered in in parallel with the monomer; it can be added in a time which is shorter or else longer than that for addition of the monomer.

In the course of the reaction it is also possible to add up to 5% by weight—based on the proportion of monomer(s) as 100% by weight of auxiliaries such as molecular weight regulators, further surfactants, acids. salts or complexing agents. In case the polymerization is carried out in presence of 3 to 10% by weight of a liquid organic expanding agent, also expandable (expanded respectively) polymers, e.g. expandable polystyrene can be produced.

For the purpose of formulation, for example in order to increase the storage stability, the end product of the emulsion polymerization can have added to it alkalis such as aqueous NaOH solution or bases (such as $NH_3$ or appropriate amines) in order to establish a pH of from 4 to 10. further known additives are preservatives such as microbicides, film formers or leveling agents, antifoams or resin emulsions which increase the adhesion (tackifiers).

The equipment employed in the external circuit is especially suitable for a large-scale industrial regime.

The low-shear pump (or pumps) must have a low shear effect on the emulsion must withstand pressures of, for example, up to 15 bar, must be insensitive to gases in the emulsion, must allow a good hourly throughput of up to 100 $m^3/h$, preferably up to 60 $M^3/h$, particularly preferably up to 45 $m^3/h$, and must also be resistant at more than 100° C. and easy to clean. Customary rotary piston pumps or gear pumps are unsuitable for the novel process. Particularly suitable pumps are nonclogging pumps which operate in accordance with the vortex principle; also possible are displacement pumps, monopumps or disk flow pumps and any pumps of a type which ensures a minimum of shear forces in order to give little or no disruption to the relatively unstable state of both the reaction mixture and the finished product emulsion. The pumps can preferably be sealed with double floating-ring seals in a back-to-back arrangement.

The heat exchanger or exchangers has or have a substantially laminiar flow profile; in other words, the action of shear forces should be minimal and, where possible, no dead zones (that is, zones not traversed by the flow) should occur. Known heat exchangers of the plate type tend to be unsuitable, since the narrow gaps and deflections mean that the mechanical resistances offered are too great; moreover, they are less suitable for a highly pressure-resistant configuration and are more difficult to clean.

The novel process is particularly suitable for preparing aqueous polymer dispersions whose films have a low glass transition temperature (DSC method); it is particularly suitable in connection with glass transition temperatures of<150° C. preferably<100° C., in particular<50° C. Furthermore, it also proves to be suitable for polymer dispersions having a mean particle size, of, preferably, from 50 to 2000 mn, in particular from 100 to 1500 nm. The polymer dispersion has a viscosity, in particular, of from 30 to 1500 mPas; in the course of polymerization, the viscosity may also be higher or lower.

In the drawing,

FIG. 2 shows a cross-section through the preferred embodiment of the heat exchanger, in plan view.

Figure 1:
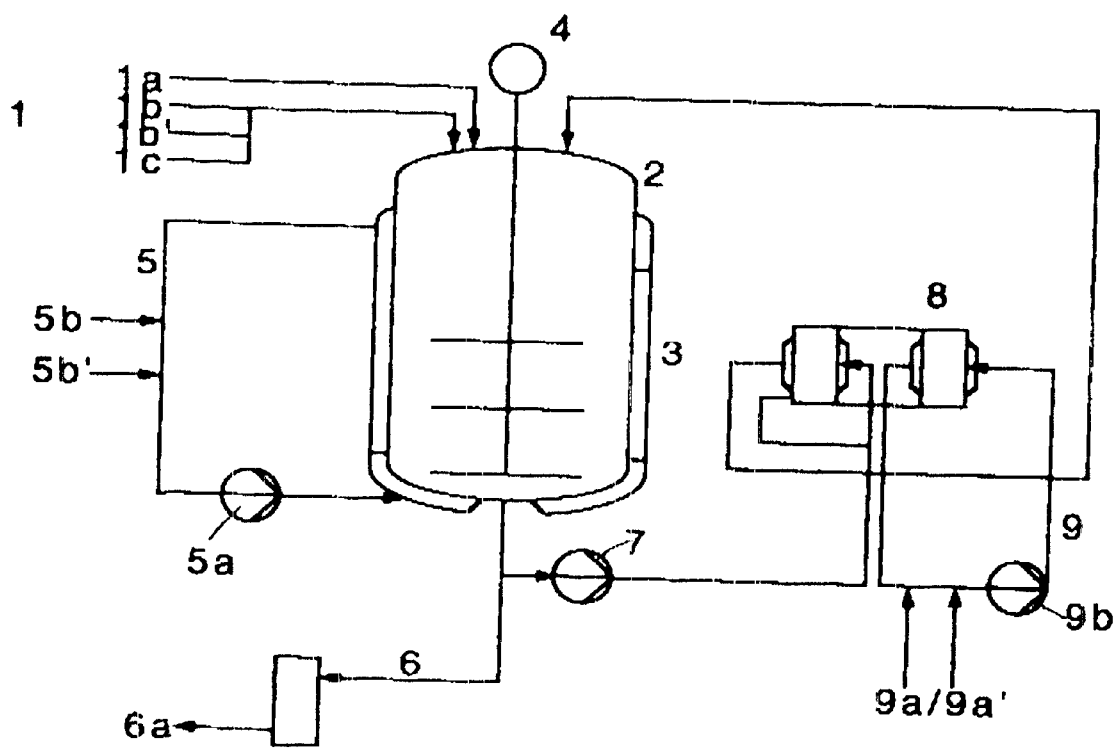
FIG. 1 shows a diagram of the components necessary for the process.

The monomer or monomers 1b/1b'. and the inhibitor 1e are fed from stock vessels or pipelines 1, with or without the supply of steam via 1a, into the polymerization reactor 2 (designed to operate, for example, to 15 bar) which in turn is fitted with a motorized stirrer 4. The reactor has a heating/cooling jacket 3 whose circuit 5 is fed with cooling water 5b or with steam 5b' and is operated via a pump 5a. The finished product from the polymerization reactor can be discharged via the pipeline 6 with steam nitrogen into a stock vessel 6a. The low-shear pump(s) 7, preferably a nonclogging vortex pump, transports the reaction mixture via a pipeline to the heat exchanger or exchangers 8, which are controled via the circuit 9 by means of a pump 9b with cooling water 9a or steam 9a The heat exchanger or exchangers have in essentially laminar flow profile, and the exchanger area is in the order of magnitude of 20 m² for a volume of about 0.3 m³. A spiral heat exchanger is preferred. The external circuit leads by way of pipelines back into the reactor 2.

In the spiral heat exchanger 8 the reaction mixture flows from the bottom into the spirally arranged section/channel 11 of the heat exchanger and out again at the exit 12. The medium which brings about heat exchange (for example a coolant or else a heating agent)—judiciously cooling water or brine, which if desired can be heated by means of steam—flows via the entry 13 into the likewise spirally arranged part 14 of the heat exchanger and out again at the top end (not shown). Preferably, the reaction mixture flows in countercurrent to the heat exchange medium. The wall-to-wall distance in the channel for the reaction mixture is judiciously greater than that in the channel for the heat exchange medium, but can also be of equal size or smaller. The temperature difference from the entry point to the exit point is judiciously from 3 to 60 K, preferably from 5 to 30 K and, in particular, from 10 to 20 K. The heat exchanger can if desired be mounted on the suspension 15 so as to be movable (for example for rotation around 90°).

In a particularly judicious embodiment of the invention the heat exchanger or exchangers are arranged horizontally relative to the polymerization reactor, so that the reaction mixture is "stationary" in the heat exchanger; in other words, the heat exchanger can be emptied completely after the end of the polymerization, which is normally carried out discontinuously. complete emptying being desirable for reasons of product homogeneity and product purity. At the bottom end the heat exchanger may have additional emptying valves (not shown).

The throughput of reaction mixture through the external circuit is generally from 5 to 100 m³//h (measured at the pump 7), preferably from 10 to 60 m³/h and, with particular preference, from 15 to 45 m³/h.

The overall content of the external circuit (not including the cooling circuits) is from about 0.9 to 0.95 m³.

The monitoring and control of the respective heating/cooling circuits of the polymerization reactor and/or of the heat exchanger or exchangers are expediently carried out by means of a cascade control; in other words, a first temperature measurement is normally made inside the polymerization reactor, a second in the heating/cooling circuit of this reactor, in combination with that of the reaction mixture in the pipeline after leaving the heat exchanger, and a third in the pipeline after leaving the heat exchanger in combination with that of the heating/cooling circuit of the heat exchanger.

In comparison with the prior art, the homopolymers and copolymers prepared in accordance with the invention can be produced in good yields within short reaction times and show no deterioration in performance properties. For example, unimodal or bimodal distributions can be produced; that is, particle size distributions having one or two narrow frequency distribution maxima. The examples which follow illustrate the invention in more detail.

EXAMPLES

In Examples 1 to 16 below and in Comparison Examples V1 to V16 the procedure adopted was as follows.

The heating/cooling circuit of the polymerization reactor is heated. Hot water is run into the reactor and, using the low-shear pump in the external circuit, this circuit is filled, including, the heat exchanger. Seed of the desired end-product composition and Na persulfate as free-radical polyrnerization initiator are run into the reactor (which, for example, has a size of from 20 to 25 m³) and the reaction medium (at this point still without monomer) is homogenized for about 5 minutes. The addition of the monomer or, in general, of the monomers (either directly or in aqueous emulsion) is then begun in an increasing amount; the amount fed in is increased sharply after about 10 to 15 minutes. The monomers can be added by varying the proportions of the monomers in the feed stream but also by varying the amounts fed in per unit time; for example, in a first feed portion the ratio of the first to the second monomer can be 70:30 and then 50:50 in the second portion, and in the first interval of time the monomer proportion is 40% and in the second it is 60% the amount of monomer fed in can also be varied, for example, such that 75 parts arc added in a first interval of time, 100 parts are added in a second interval of time, of equal length, and 150 parts are added in a third interval of time, which is four times is long, in each case at a constant rate of feed. Within one interval of time, the amount fed in can also be increased or lowered continuously. The end of the addition of the reaction components and auxiliaries does not yet mark the end of the reaction; rather, the reaction mixture is given the opportunity for polymerization to be completed. During the above stages and also in the cooling phase mentioned below, the reaction mixture is transported continually at a rate of about 20 to 30 m³/h through the external circuit by means of the low-shear pump. In the cooling phase, the reaction product is cooled to 65–70° C., the low-shear pump of the external circuit is switched off, and the product is discharged into stock vessels via a pipeline using steam and nitrogen. The monomers employed in the Examples (always with external circuit) and Comparison Examples (always without external circuit), their proportions in percent by weight (the deficit from 100 is accounted for by further comonomers, predominantly water-soluble monomers such as unmodified or functionalized (meth)acrylarnidc (meth)acrytic acid or crossinking monomers such as butanediol diacrylate or N-methylolacrylamide, which are present in the copolymer only in a minor amount), the polymerization temperatures and the times for addition of the monomer are given in the table below.

The amount of seed employed is from about 0.2 to 1.2 parts by weight of monomer or water. The weight ratio of monomer to water is in the order of 1:1, and the dispersing (emulsifying) auxiliary is added in a proportion of about 1 part by weight.

In the case of the novel process the performance properties are comparable with those from the prior art; for example, the reaction products of Examples 1 to 16 can be used as a paper-coating slip, paint/coating material component, adhesive, cement modifier or leather auxiliary.

TABLE

| Example/ Comparison Example | Monomer composition in % by wt.[1] | PT[2] | Addition time for the monomers[3] a) | b) | Comparison[4] PT | Addition time in h |
|---|---|---|---|---|---|---|
| 1 V1 | BA 60/S 10/AN 25 | 90 | 3.0 | 1.2 | 100 | 2.5 |
| 2 V2 | BA 65/S 15/AN 15 | 85 | 6.0 | 2.0 | — | — |
| 3 V3 | BA 48/S 48 | 90 | 3.5 | 1.5 | 95 | 3.0 |
| 4 V4 | BA 50/S 15/AN 30 | 80 | 7.0 | 2.0 | 100 | 3.0 |
| 5 V5 | S 55/Bu 20/BA 20 | 75 | 8.5 | 2.0 | 95 | 4.0 |
| 6 V6 | S 65/Bu 30 | 95 | 4.0 | 2.0 | — | — |
| 7 V7 | S 44/Bu 54 | 95 | 4.0 | 2.0 | — | — |
| 8 V8 | BA 55/VAc 42 | 90 | 3.0 | 1.2 | — | — |
| 9 V9 | BA 88/AN 10 | 85 | 3.0 | 1.5 | — | — |

TABLE-continued

| Example/ Comparison Example | Monomer composition in % by wt.[1] | PT[2] | Addition time for the monomers[3] a) | b) | Comparison[4] PT | Addition time in h |
|---|---|---|---|---|---|---|
| 10 V10 | EHA 75/ MMA 10/ VAc 10 | 85 | 4.0 | 1.5 | — | — |
| 11 V11 | MMA 50/ BA 45 | 85 | 3.0 | 1.5 | — | — |
| 12 V12 | BA 55/S 40 | 60 | 3.5 | 1.5 | — | — |
| 13 V13 | BA 55/S 30/ AN 10 | 60 | 4.5 | 1.5 | — | — |
| 14 V14 | BMA 90 | 85 | 3.0 | 1.5 | — | — |
| 15 V15 | EHA 80/AN 10 | 70 | 3.0 | 1.5 | — | — |
| 16 V16 | BA 85/VAc 5/ AN 5 | 85 | 7.0 | 2.0 | — | — |

[1]BA = Buryl acrylate
S = Styrene
VAc = Vinyl acetate
MMA = Methyl methacrylate
AN = Acrylonitrile
Bu = Butadiene
BMA = n-Butyl methacrylate
EHA = 2-Ethylhexyl acrylate
[2]PT = Polymerization temperature in ° C.
[3]Time in h, a) comparison, b) according to the invention, same PT for a) and b)
[4]Comparison at higher temperature and lower addition times (high-temperature method), the quality of the product often exhibiting performance weaknesses.

We claim:

1. A process for preparing homo-or copolymers of at least one of the polymerizable monomers of the group consisting of styrene, butadiene, vinyl chloride, vinyl acetate, vinylidene chloride, alkyl (meth)acrylate (meth)acrylic cid (meth)acrylonitrile and (meth)acrylamide in an emulsion polymerization technique at a least 40° C. in the presence of a dispersing auxiliary and of a free-radical polymerization initiator, which comprises preparing the polymer, at least 85% by weight of which is formed from one or more of these monomers, in the following stages, where
   a) in a first stage water is added as a solvent which is inert in the reaction, and dispersing auxiliaries, seed and a first portion of monomer(s) are added if desired,
   b) in a second stage initiator is added, and
   c) in a third stage the remainder or all of the monormer(s) is added directly or in emulsion form and in the presence of further water and, if desired, further dispersing auxiliary or other auxiliaries,
   it also being possible to operate the stages a) and b) or b) and c) as a single stage, and
   wherein the process further comprises
      in at least one of stages a) to c), moving the reaction mixture in its dispersion form by means of an external circuit which leads from and back to the reaction vessel and comprises at least one low-shear pump selected from the group consisting of nonclogging pumps which operate in accordance with the vortex principle, displacement pumps, monopumps and disc flow pumps and at least one heat exchanger having an essentially laminar flow profile, and
      carrying out polymerization at from 40 to 120° C.

2. A process as claimed in claim 1, wherein the heat exchanger is not of the plate type.

3. A process as claimed in claim 1, wherein the low-shear pump is a nonclogging pump.

4. A process as claimed in claim 1, wherein the heat exchanger is a spiral heat exchanger.

5. A process as claimed in claim 1, wherein the heat exchanger is arranged horizontally in relation to the reaction vessel.

6. A process as claimed in claim 1, wherein at least 90% by weight of the polymer is formed from one or more of the monomers.

7. A process as claimed in claim 1, wherein at least 93% by weight of the polymer is formed from one or more of the monomers.

8. A process as claimed in claim 1, wherein the polymerization is carried out at from 50 to 100° C.

9. A process as claimed in claim 1, wherein the monomer is at least one from the group consisting of styrene, butadiene, alkyl (meth)acrylate and (meth)acrylonitrile.

10. A process as claimed in claim 1, wherein the throughput of reaction mixture through the external circuit is from 5 to 100m³/h, in particular from 10 to 60 m³/h.

11. A process as claimed in claim 4, wherein the polymerization is carried out at from 70 to 95° C.

12. A process for preparing homo- or copolymers of at least one of the polymerizable monomers of the group consisting of styrene, butadiene, vinyl chloride, vinyl acetate, vinylidene chloride, alkyl (meth)acrylate (meth) acrylic acid, (meth)acrylonitrile and (meth)acrylamide in an emulsion polymerization technique at at least 40° C. in the presence of a dispersing auxiliary and of a free-radical polymerization initiator, which consists essentially of preparing the polymer, at least 85% by weight of which is formed from one or more of these monomers, in the following stages, where
   a) in a first stage water is added as a solvent which is inert in the reaction, and dispersing auxiliaries, seed and a first portion of monomer(s) are added if desired,
   b) in a second stage initiator is added, and
   c) in a third stage the remainder or all of the monomer(s) is added directly or in emulsion form and in the presence of further water and, if desired, further dispersing auxiliary or other auxiliaries,
   it also being possible to operate the stages a) and b) or b) and c) as a single stage, and
   wherein the process further comprises
      in at least one of stages a) to c), moving the reaction mixture in its dispersion form by means of an external circuit which leads from and back to the reaction vessel and comprises at least one low-shear pump selected from the group consisting of nonclogging pumps which operate in accordance with the vortex principle, displacement pumps, monopumps and disc flow pumps and at least one heat exchanger having an essentially laminar flow profile, and
      carrying out polymerization at from 40 to 120° C.

13. A process as claimed in claim 12, wherein the polymerization is carried out at from 70 to 95° C. and the heat exchanger is a spiral heat exchanger.

* * * * *

UNITED STATES PATENT AND TRADEMARK OFFICE
CERTIFICATE OF CORRECTION

PATENT NO. : 6,660,814 B1
DATED : December 9, 2003
INVENTOR(S) : Kroener et al.

It is certified that error appears in the above-identified patent and that said Letters Patent is hereby corrected as shown below:

<u>Title page</u>,
Item [75], Inventors, the first inventor's first name "Huberrus" should be
-- Hubertus --.
Item [57], ABSTRACT,
Line 5, "(meth)acrylatc" should be -- (meth)acrylate --.

<u>Column 7</u>,
Line 34, "cid" should be -- acid --.
Line 37, "at a least" should be -- at at least --.

Signed and Sealed this

Fifteenth Day of June, 2004

JON W. DUDAS
*Acting Director of the United States Patent and Trademark Office*